United States Patent
Sivaswamy et al.

(10) Patent No.: US 11,575,638 B2
(45) Date of Patent: Feb. 7, 2023

(54) CONTENT ANALYSIS MESSAGE ROUTING

(71) Applicant: International Business Machines Corporation, Armonk, NY (US)

(72) Inventors: Hemant Kumar Sivaswamy, Pune (IN); Venkata Vara Prasad Karri, Visakhapatnam (IN); Ram Kumar Vadlamani, Westford, MA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/212,107

(22) Filed: Mar. 25, 2021

(65) Prior Publication Data

US 2022/0311728 A1   Sep. 29, 2022

(51) Int. Cl.
*H04L 51/48* (2022.01)
*G06N 3/04* (2006.01)
*G06N 3/08* (2006.01)

(52) U.S. Cl.
CPC ............ *H04L 51/48* (2022.05); *G06N 3/04* (2013.01); *G06N 3/08* (2013.01)

(58) Field of Classification Search
CPC ........... H04L 51/28; H04L 51/48; G06N 3/04; G06N 3/08
USPC ........................................................ 709/206
See application file for complete search history.

(56) References Cited

U.S. PATENT DOCUMENTS

| | | | | |
|---|---|---|---|---|
| 10,171,403 | B2* | 1/2019 | Ashoori | H04L 51/18 |
| 2007/0130368 | A1* | 6/2007 | Martin | G06Q 10/107 |
| | | | | 709/245 |
| 2009/0006285 | A1* | 1/2009 | Meek | G06Q 10/10 |
| | | | | 707/999.1 |
| 2009/0049140 | A1* | 2/2009 | Stoddard | G06Q 10/107 |
| | | | | 709/206 |
| 2010/0017194 | A1* | 1/2010 | Hammer | G06F 40/30 |
| | | | | 704/9 |
| 2010/0046842 | A1 | 2/2010 | Conwell | |
| 2010/0179961 | A1* | 7/2010 | Berry | G06F 40/284 |
| | | | | 707/769 |
| 2012/0323909 | A1 | 12/2012 | Behforooz et al. | |
| 2014/0156743 | A1* | 6/2014 | Veda | G06Q 10/10 |
| | | | | 709/204 |
| 2016/0021179 | A1 | 1/2016 | James et al. | |

(Continued)

OTHER PUBLICATIONS

Google Goggles Experiment Video, 3 pages, Nov. 15, 2010, downloaded at: https://www.youtube.com/watch?v=bq-hXD33vXs.

(Continued)

*Primary Examiner* — James E Springer
(74) *Attorney, Agent, or Firm* — Kelsey M. Skodje

(57) ABSTRACT

A first message is detected. The first message is directed towards a first messaging recipient in a messaging application. The first message contains one or more content items. A set of one or more candidate messaging recipients is determined based on the first message and based on a content analysis of the one or more content items. A second messaging recipient is identified from the set of one or more candidate messaging recipients. The identification is based on the content analysis. The first message is routed to the second messaging recipient. The first message is routed in response to the identifying the second messaging recipient.

20 Claims, 6 Drawing Sheets

(56) References Cited

U.S. PATENT DOCUMENTS

| | | | |
|---|---|---|---|
| 2016/0062984 A1* | 3/2016 | Caliendo, Jr. | G06F 3/0488 |
| | | | 704/9 |
| 2017/0201575 A1* | 7/2017 | Song | H04L 51/02 |
| 2020/0076754 A1 | 3/2020 | Kim et al. | |
| 2020/0112838 A1 | 4/2020 | Fox et al. | |

OTHER PUBLICATIONS

Google Goggles 3.0.208511728, Google Inc., 5 pages, downloaded on Mar. 12, 2021 at: https://google-goggles.en.uptodown.com/android.

How to Send and Manage Group Messages , Test Request, Jul. 31, 2020, downloaded at: https://www.textrequest.com/queuniversity/group-messages/.

Chen, Hong-Ming, et al. "SheepDog-Group and Tag Recommendation for Flickr Photos by Automatic Search-based Learning", 4 pages, 2008.

Mell, P. et al., "The NIST Definition of Cloud Computing", Recommendations of the National Institute of Standards and Technology, NIST Special Publication 800-145, 7 pages, Sep. 2011.

\* cited by examiner

CONTENT ANALYSIS MESSAGE ROUTING

BACKGROUND

The present disclosure relates to messaging applications, and more specifically, to routing messages based on analysis of content in messages.

Messaging applications may be used to facilitate the communication of users by way of electronic devices and computers. Messaging applications may be useful to present information and exchange ideas between users. Messaging applications may become less effective if they transmit erroneous or excessive data.

SUMMARY

According to embodiments, disclosed are a method, system, and computer program product. A first message is detected. The first message is directed towards a first messaging recipient in a messaging application. The first message contains one or more content items. A set of one or more candidate messaging recipients is determined based on the first message and based on a content analysis of the one or more content items. A second messaging recipient is identified from the set of one or more candidate messaging recipients. The identification is based on the content analysis. The first message is routed to the second messaging recipient. The first message is routed in response to the identifying the second messaging recipient.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
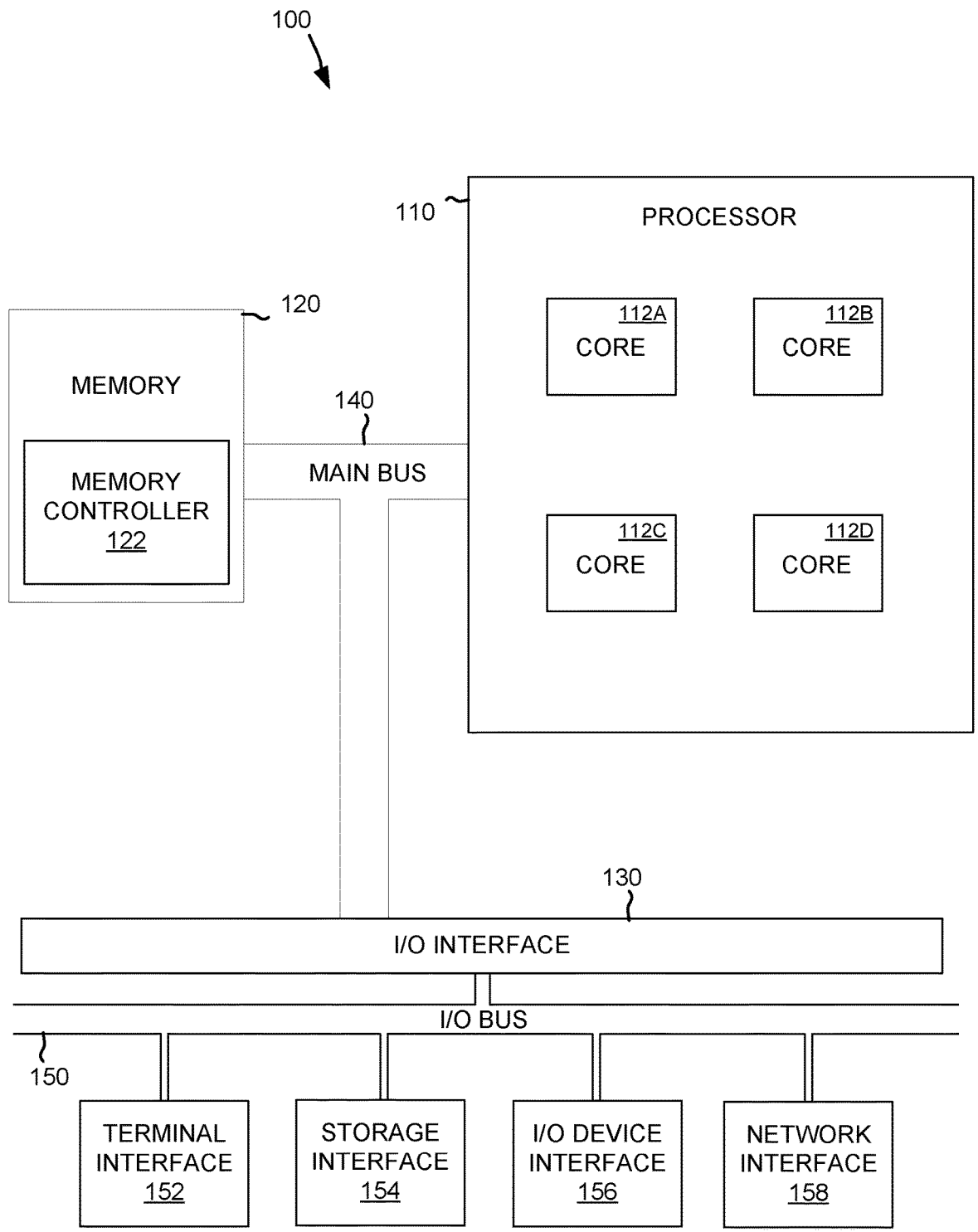
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to messaging applications; more particular aspects relate to routing messages based on analysis of content in messages. While the present disclosure is not necessarily limited to such applications, various aspects of the disclosure may be appreciated through a discussion of various examples using this context.

Increasingly, users may utilize computers to communicate with each other. There are many different communication programs (alternatively, messaging applications) that are available to a user by way of electronic devices and computers. Example programs that may be considered messaging applications may include email applications, text message applications, chat applications, instant messaging applications, message board applications, and the like. These computer programs may be configured to provide communication channels for users.

Messaging applications may be useful to present information and exchange ideas between users on a daily basis and to facilitate the communication of users. Specifically, messaging applications can be powerful in that within a few seconds a user can select an application window, start typing a message, and send it to a messaging recipient. Similarly, it may only take a few seconds to receive a message from another user. For example, users may log into their computers and may communicate by using messaging applications with colleagues to share vital work information and exchanging business critical information. Further, users may use messaging applications to exchange less critical information. For example, a user may throughout any given day send and receive dozens of messages in various messaging applications to determine the latest news, exchange potential new work concepts, share new information, conduct casual conversation and the like.

Messaging groups may allow for increased distribution of information to various parties. Specifically, messaging applications may be configured to direct information to a messaging recipient (alternatively, recipient). A messaging recipient may be a single individual.

For example, a first user may generate a message through a messaging application and the recipient may be a second individual. Messaging groups may facilitate the transmission to multiple individuals. For example, a user may designate in a messaging application a recipient as a messaging group. A messaging group may contain multiple recipients, such as four individuals, a dozen individuals, thirty-seven individuals, and in some instances hundreds or thousands of individuals.

Messaging applications, however, may become less effective if they transmit erroneous or excessive data. Various users may be a part of many multiple conversations and messaging groups. For example, users may not be able to focus or keep up as many users provide certain messages into messaging groups. Sometimes the messages may be off topic from the purpose or use of the group. Other times users may be genuinely trying to share information that is helpful, but they are mistaken on the proper messaging recipient. It may be complicated and difficult for a user to find the proper recipient, and so a user may be discouraged from sharing information. For example, a messaging system may have dozens of different channels, messaging groups, or recipients. A user may have a piece of information that they would like to disseminate, such as a lost item found at a particular work site. A user may not know the recipient that the message regarding the lost item should be shared with.

Every recipient messaging group and conversation may have a different particular set or habits and rules that users should follow. The ability to follow these rules may lead to confusion for users, as they may not remember which guidelines are associated with each particular recipient. For example, a user may be a part of a first messaging group that contains a dozen people and is dedicated to discussion of sports and current events. This first messaging group may not have any particular guidelines regarding communicating and users may post whatever information freely. In another example, a second messaging group may be a corporate location related recipient. The corporate location related recipient may have guidelines and focus on receiving and distributing messages that are more restrictive.

There may also be technical challenges regarding messaging applications. In a first example, the various recipients including individual recipients and group recipients may have various permissions values that are set by an administrator as a part of a default installation. For example, a corporation may deploy a messaging application across various divisions and locations for the users on the corporate network. The deployed application may include default groups for various roles such as sales, marketing, information technology, building facilities, security, and the like. Each of the various roles may be assigned a default group and may be filled by way of access to an already established organizational chart. One of the technical challenges is that a user may not have permission to the proper group. For example, a user may prefer to share or access a particular group recipient, such as location facilitates messaging group, to share information such as a picture and text describing a broken faucet. To share the broken faucet information the user may not have permission to discover or identify or search for the location facilities group recipient. If a user can discover or identify the location facilities group recipient, the user may not have permission to share messages with that particular group. Another of the technical challenges are the amount of computer resources needed to successful run a messaging application. Specifically, messaging applications may take large amounts of processing, memory, and network bandwidth. For example, a first messaging group may have dozens or hundreds (or more) of group members that are a part of the first messaging group. Any time an individual user sends a message to the first messaging group, it may take significant processing power, memory usage, and network bandwidth to transmit the message to all parties.

Content Analysis Message Routing (CAMR) may provide one or more advantages in messaging applications. CAMR may be configured to detect that a message is directed towards a recipient, such as an individual recipient or a group of multiple recipients. CAMR may be configured to determine one or more content items that are a part of the message, such as text, photos, metadata, attachments or other elements that are a part of the message. The CAMR may perform a content analysis to determine the content items and the elements contained in the content elements, such as by performing an artificial intelligence operation.

The CAMR may be configured as a default operation of a particular messaging application or messaging service. Specifically, the CAMR may be configured to receive a message from any particular user if the user does not select a particular recipient. Not selecting a particular recipient may include when a user creates a new message and the user leaves the recipient, "to", "Target:" or other relevant recipient field blank or unfilled, or without any information in it. The CAMR may also be configured to receive all messages that a user sends by default without a user selecting a particular recipient, or if the user sends any particular recipient. In some embodiments, the CAMR may also be configured to receive all messages that are sent to a particular group (e.g., groups of a particular name, groups of a particular type, groups with a particular size or number of members/recipients).

The CAMR may be configured to route messages to a proper recipient based on the content analysis of the message. The routing of messages may be based on selecting one or more candidate messages. Selecting a candidate message may be based on the content analysis and/or other relevant artificial intelligence operation of a computer. The routing may include selecting a particular recipient when no recipient has been specified. The routing may include removing a particular message from a first recipient that was selected by the user. For example, a user may send a message to a first messaging recipient that includes general counsel of a particular division of a company. The CAMR may determine that an appropriate location is an intellectual property counsel of the company instead of the general counsel. In some embodiments, the CAMR may remove the message from an outbound queue of the general counsel message group, before the message is delivered. The CAMR may determine a particular contact or policy for routing of messages. For example, The CAMR may be configured to identify various client devices, messaging hosts, and contacts, leaders, or assigned entities of particular recipients or group recipients. The CAMR may select or determine that a particular contact, leader or assigned entity is a candidate for receiving a message FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
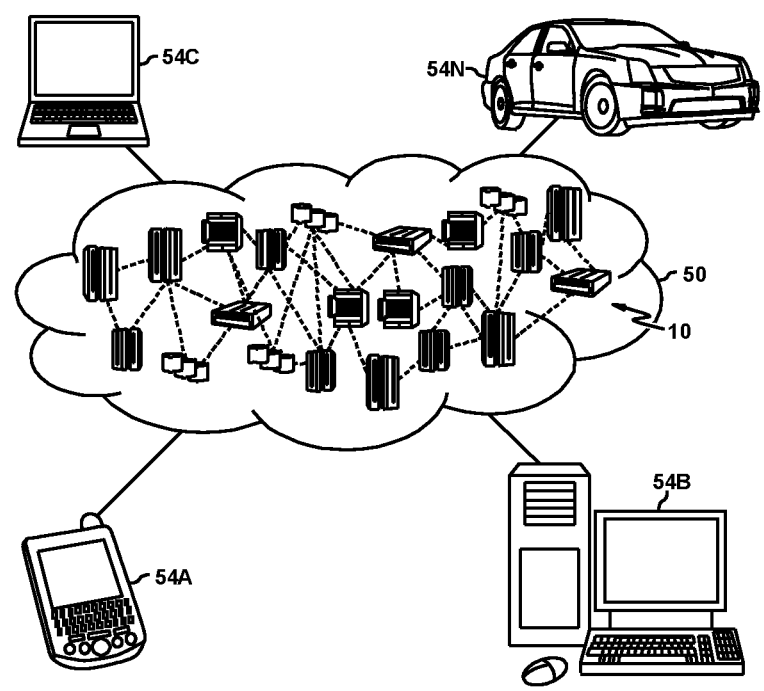
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
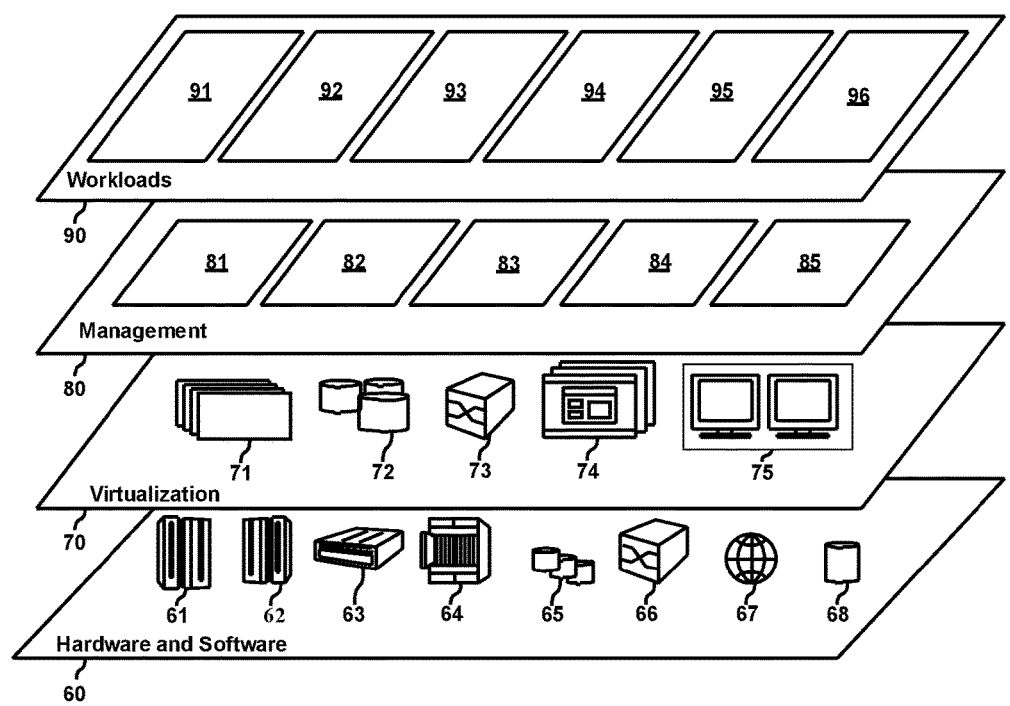
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and CAMR 96.

The CAMR may perform one or more artificial intelligence operations to detect the content items as part of content analysis. Specifically, the CAMR may perform image processing, machine learning, and/or natural language processing to identify a particular element that is part of a content item of a particular message or messages. A message may contain text, such as words that describe various subjects. A message may contain images such as photographs, pictures, renderings, videos, streams, video files, audio-video files, or other visual data. The images may also contain metatdata, such as one or more fields or attributes that describes certain information (e.g., EXIF data). For example, a message may contain text that states, "I noticed that there is a red car with its lights on in the parking lot." The message may include images, such as a color photograph that depicts the car with its lights on. The CAMR may perform various content analysis to detect and determine the various text, image data, and metadata of messages, to determine the content items for a selection of one or more candidate recipients.

The CAMR may leverage image processing to determine the content items. Image processing may be performed through a collection of hardware, software, firmware, or some combination. For example, image processing may be performed by an application specific integrated circuit, field programmable gate array, or other relevant processing apparatus (e.g., embodied as hardware and/or software of computer 100).

The image processing may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processing may be configured to aid in identifying a face, object, person, or other entity (e.g., by analyzing images of faces using a model built on training data, by analyzing images of objects as part of a machine learning model).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a photo that is included as part of a message in a messaging application may be analyzed. Using a relevant object detection algorithm, the subject of an image included in a message may be identified and tagged (e.g., "dog", "lost key", "wallet", "car with lights on").

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects in an image that is part of a message (e.g., a tree, a human face, a dog, etc.) can be output as classifications determined by the supervised machine learning model. For example, if a user snaps an image of an automobile for transmitting through a messaging application, a supervised machine learning algorithm may be configured to output an identity of the object (e.g., automobile) as well as various characteristics of their vehicle (e.g., the model, make, color, etc.).

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc., of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., three keys on a keychain), colors of object, and/or other attributes of objects. In some embodiments, the output may generate a list including the identity and/or characteristics of objects (e.g., cotton shirt, metal glasses, etc.). In some embodiments, the output may include an indication that an identity or characteristic of an object is unknown. The indication may include a request for additional input data that can be analyzed such that the identity and/or characteristics of objects may be ascertained. For example, a user that generates a message may be prompted to provide information, such as a time when the image was taken, a place where the image was taken, one or more keywords for tagging (e.g., "keys", "lost", "missing", "found", "broken") the subject in the image and for processing by the content analysis of the CAMR. In some embodiments, various objects, object attributes, and relationships between objects (e.g., hierarchical and direct relations) may be represented within a knowledge graph (KG) structure. Objects may be matched to other objects based on shared characteristics (e.g., paint color on parts of a body panel of an automobile, material texturing on a key), relationships with other objects (e.g., an eye belongs to a face), or objects belonging to the same class (e.g., two bolt-heads are metric sized).

In some embodiments, CAMR may perform content analysis by using or executing machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, CAMR may be configured to perform natural language processing and may include various components (not depicted) operating through hardware, software, or in some combination. For example, a processor, one or more data sources, a search application, and a report analyzer. The processor may be a computer module that analyses the received content and other information (e.g., processor 110. The processor may perform various methods and techniques for analyzing textual information (e.g., syntactic analysis, semantic analysis, etc.). The processor may be configured to recognize and analyze any number of natural languages. In some embodiments, the processor may parse passages of documents or content from messages that are trying to be sent by a user from a messaging application, client, or service. Various components (not depicted) of the processor may include, but are not limited to, a tokenizer, a part-of-speech (POS) tagger, a semantic relationship identifier, and a syntactic relationship identifier. The processor may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., messages written by users). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by natural language processing.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the processor may be a computer module that may parse a document and generate corresponding data structures for one or more portions of the document. For example, in response to receiving a textual elements that is part of a passage or other text of a message at the natural language processing, the processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

Figure 4:
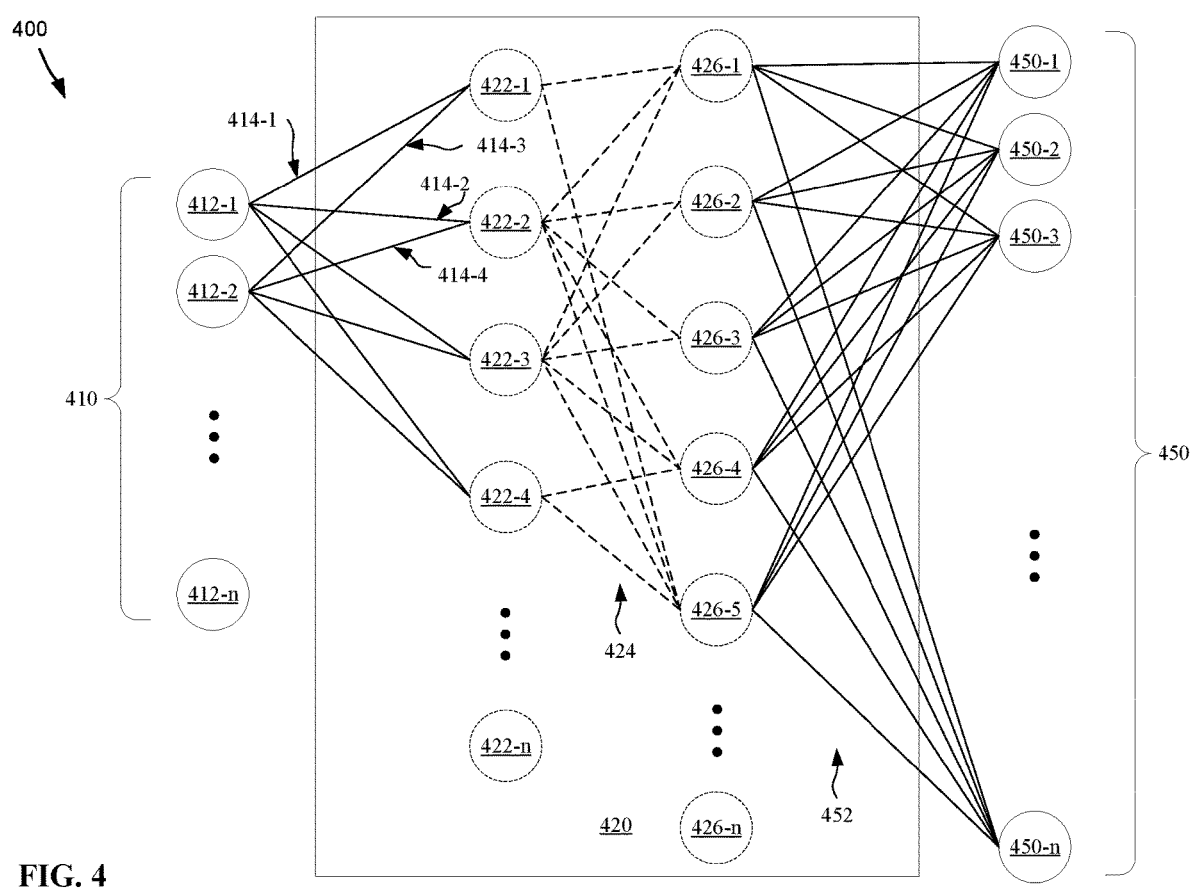
FIG. 4 depicts an example neural network representative of one or more artificial neural networks capable of performing content analysis for message rerouting consistent with embodiments of the present disclosure.

FIG. 4 depicts an example neural network (alternatively, "network") 400 representative of one or more artificial neural networks capable performing content analysis for message rerouting consistent with embodiments of the present disclosure. The neural network 400 is made up of a plurality of layers. The network 400 includes an input layer 410, a hidden section 420, and an output layer 450. Though network 400 depicts a feed-forward neural network, it should be appreciated that other neural networks layouts may also be configured to perform content analysis on messages of a CAMR for a messaging application such as a recurrent neural network layout (not depicted). In some embodiments, the network 400 may be a design-and-run neural network and the layout depicted may be created by a computer programmer. In some embodiments, the network 400 may be a design-by-run neural network, and the layout depicted may be generated by the input of data and by the process of analyzing that data according to one or more defined heuristics. The network 400 may operate in a forward propagation by receiving an input and outputting a result of the input. The network 400 may adjust the values of various components of the neural network by a backward propagation (back propagation).

The input layer 410 includes a series of input neurons 412-1, 412-2, up to 412-n (collectively, 412) and a series of input connections 414-1, 414-2, 414-3, 414-4, etc. (collectively, 414). The input layer 410 represents the input from data that the neural network is supposed to analyze (e.g., an image in a message, text from a message, tokenized text from natural language processing, metadata of an image that is part of a message). Each input neuron 412 may represent a subset of the input data. For example, the neural network 400 is provided with an image as input, and the image is represented by input data for every third pixel of the image. For example, the neural network 400 is provided with a text as input, and the text is represented by input data that represents tokens, words, descriptors, tags, or other relevant natural language processing output of the text.

In another example, input neuron 412-1 may be the first pixel of a picture, input neuron 412-2 may be the second pixel of the picture, etc. The number of input neurons 412 may correspond to the size of the input. For example, when neural network 400 is designed to analyze images that are 256 pixels by 256 pixels, the neural network layout may include a series of 65,536 input neurons. The number of input neurons 412 may correspond to the type of input. For example when the input is a color image that is 256 pixels by 256 pixels, the neural network layout may include a series of 196,608 input neurons (65,536 input neurons for the red values of each pixel, 65,536 input neurons for the green values of each pixel, and 65,536 input neurons for the blue values of each pixel). The type of input neurons 412 may correspond to the type of input. In a first example, a neural network may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, a neural network may be designed to analyze images that are color, and each of the input neurons may be a three dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 414 represent the output of the input neurons 412 to the hidden section 420. Each of the input connections 414 varies depending on the value of each input neuron 412 and based upon a plurality of weights (not depicted). For example, the first input connection 414-1 has a value that is provided to the hidden section 420 based on the input neuron 412-1 and a first weight. Continuing the example, the second input connection 414-2 has a value that is provided to the hidden section 420 based on the input neuron 412-1 and a second weight. Further continuing the example, the third input connection 414-3 based on the input neuron 412-2 and a third weight, etc. Alternatively stated, the input connections 414-1 and 414-2 share the same output component of input neuron 412-1 and the input connections 414-3 and 414-4 share the same output component of input neuron 412-2; all four input connections 414-1, 414-2, 414-3, and 414-4 may have output components of four different weights. Though the network neural 400 may have different weightings for each connection 414, some embodiments may contemplate weights that are similar. In some embodiments, each of the values of the input neurons 412 and the connections 414 may necessarily be stored in memory.

The hidden section 420 includes one or more layers that receive inputs and produce outputs. The hidden section 120 includes a first hidden layer of calculation neurons 422-1, 422-2, 422-3, 422-4, up to 422-n (collectively, 422); a second hidden layer of calculation neurons 426-1, 426-2, 426-3, 426-4, 426-5, up to 426-n (collectively 426); and a series of hidden connections 424 coupling the first hidden layer and the second hidden layer. It should be appreciated that neural network 400 only depicts one of many neural networks capable of content analysis as part of CAMR consistent with some embodiments of the disclosure. Consequently, the hidden section 420 may be configured with more or less hidden layers (e.g., one hidden layer, seven hidden layers, twelve hidden layers, etc.)—two hidden layers are depicted for example purposes.

The first hidden layer 422 includes the calculation neurons 422-1, 422-2, 422-3, 422-4, up to 422-n. Each calculation neuron of the first hidden layer 422 may receive as input one or more of the connections 414. For example, calculation neuron 422-1 receives input connection 414-1 and input connection 414-2. Each calculation neuron of the first hidden layer 422 also provides an output. The output is represented by the dotted lines of hidden connections 424 flowing out of the first hidden layer 422. Each of the calculation neurons 422 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 422 also contains a bias (not depicted). The bias may be used to decide the likelihood or valuation of a given activation function. In some embodiments, each of the values of the biases for each of the calculation neurons must necessarily be stored in memory.

The neural network 400 may include the use of a sigmoid neuron for the activation function of calculation neuron 422-1. An equation (Equation 1, stated below) may represent the activation function of calculation neuron 412-1 as f(neuron). The logic of calculation neuron 422-1 may be the summation of each of the input connections that feed into calculation neuron 422-1 (i.e., input connection 414-1 and input connection 414-3) which are represented in Equation 1 as j. For each j the weight w is multiplied by the value x of the given connected input neuron 412. The bias of the calculation neuron 422-1 is represented as b. Once each input connection j is summed the bias b is subtracted. Finalizing the operations of this example as follows: given a larger positive number of results from the summation and bias in activation f(neuron), the output of calculation neuron 422-1 approaches approximately 1; given a larger negative number of results from the summation and bias in activation f(neuron), the output of calculation neuron 422-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \qquad \text{Equation 1}$$

The second hidden layer 426 includes the calculation neurons 426-1, 426-2, 426-3, 426-4, 426-5, up to 426-n. In some embodiments, the calculation neurons of the second hidden layer 426 may operate similarly to the calculation neurons first hidden layer 422. For example, the calculation neurons 426-1 to 426-n may each operate with a similar activation function as the calculation neurons 422-1 to 422-n. In some embodiments, the calculation neurons of the second hidden layer 426 may operate differently to the calculation neurons of the first hidden layer 422. For example, the calculation neurons 426-1 to 426-n may have a first activation function, and the calculation neurons 422-1 to 422-n may have a second activation function.

Similarly, the connectivity to, from, and between the various layers of the hidden section 420 may also vary. For example, the input connections 414 may be fully connected to the first hidden layer 422 and hidden connections 424 may be fully connected from the first hidden layer to the second hidden layer 426. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 414 may not be fully connected to the first hidden layer 422 and the hidden connections 424 may not be fully connected from the first hidden layer to the second hidden layer 426.

Further, the parameters to, from, and between the various layers of the hidden section 420 may also vary. In some embodiments, the parameters may include the weights and the biases. In some embodiments, there may be more or less parameters than the weights and biases. For purposes of example, neural network 400 may be in the form of a convolutional neural network or convolution network. The convolutional neural network may include a sequence of heterogeneous layers (e.g., an input layer 410, a convolution layer 422, a pooling layer 426, and an output layer 450). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 450 includes a series of output neurons 450-1, 450-2, 450-3, up-to 450-n (collectively, 450). The output layer 450 holds a result of the analyzation of the neural network 400. In some embodiments, the output layer 450 may be a categorization layer used to identify a feature of the input to the network 400. For example, the network 400 may be a classification network trained to identify Arabic numerals. In such an example, the network 400 may include ten output neurons 450 corresponding to which Arabic numeral the network has identified (e.g., output neuron 450-2 having a higher activation value than output neurons 450 may indicate the neural network determined an image contained the number '1'). In some embodiments, the output layer 450 may be a real-value target (e.g., trying to predict a result when an input is a previous set of results) and there may be only a singular output neuron (not depicted). The output layer 450 is fed from an output connection 452.

The output connection 452 provides the activations from the hidden section 420. In some embodiments, the output connections 452 may include weights and the output neurons 450 may include biases.

Training the neural network depicted by neural network 400 may include performing back propagation. Back propagation is different from forward propagation. Forward propagation may include feeding of data into the input neurons 410; performing the calculations of the connections 414, 424, 452; and performing the calculations of the calculation neurons 422 and 426. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the network 400 by starting with the output neurons 450 and propagating the error backward through the various connections 452, 424, 414 and layers 426, 422, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination.

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 400. The network 400 is provided a given number of training inputs n in a subset (or entirety) of training data that have input values x. The network 400 may yield output a from x and should yield a desired output y(x) from x. Back propagation or training of the network 400 should be a reduction or minimization of the objective function 'O(w,b)' via alteration of the set of weights and biases. Successful training of network 400 should not only include the reduction of the difference between the answer a and the correct answers y(x) for the input values x, but given new input values (e.g., from additional training data, from validation data, etc.).

$$O(w, b) \equiv \frac{1}{2n} \sum_x \|y(x) - a\|^2 \quad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 400 may be small in any given iteration. Back propagation algorithms may need to be repeated for many iterations to perform accurate learning as a result of the necessitated smallness of any given iteration.

For example, neural network 400 may have untrained weights and biases, and back propagation may involve the stochastic gradient descent to train the network over a subset of training inputs (e.g., a batch of 10 training inputs from the entirety of the training inputs). Continuing the example, network 400 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). Further, network 400 may be evaluated to quantify the performance of evaluating a dataset, such as by use of an evaluation metric (e.g., mean squared error, cross-entropy cost function, accuracy functions, confusion matrix, precision-recall curve, mean absolute error, etc.). Training of network 400, may be performed until a particular predefined accuracy threshold is met. For example, a number of epochs may need to be adjusted to ensure and validate an accuracy that is over 90%. The validation may also be performed by a user to ensure one or more of the following: removal of samples from over-represented classes (alternatively, an under-sampling technique); and adding more samples from under-represented classes (alternatively, an over-sampling technique)

Example network 400 may be configured as a multiclassification model for determining how to route or send messages from a user that generates the messages to one or more recipients and/or group recipients. For example, network 400 may be configured to take as input image data, natural language processing data, classification information, user-generated tags, machine-generated tags, all to input layer 410. Other information may also be provided to network 400 as part of the multiclassification model, such as geographical information (e.g., latitude and longitudinal coordinates, city names), user-generated image descriptions, message thread titles, message recipient names, message creators, messages group organizers, and other relevant message and message recipient information. In another example, network 400 may be configured as a SDCA multi-class classifier, or an averaged perceptron trainer.

Network 400 may be configured to perform input from a particular application, such as a console application, or from a particular application programming interface of an application suite or as a plugin or a part of CAMR operation. Network 400 may also be configured to receive various textual or other structured data as data sources. For example, a comma separated, or tab separated file or files may be used as a source of data for network 400.

Figure 5:
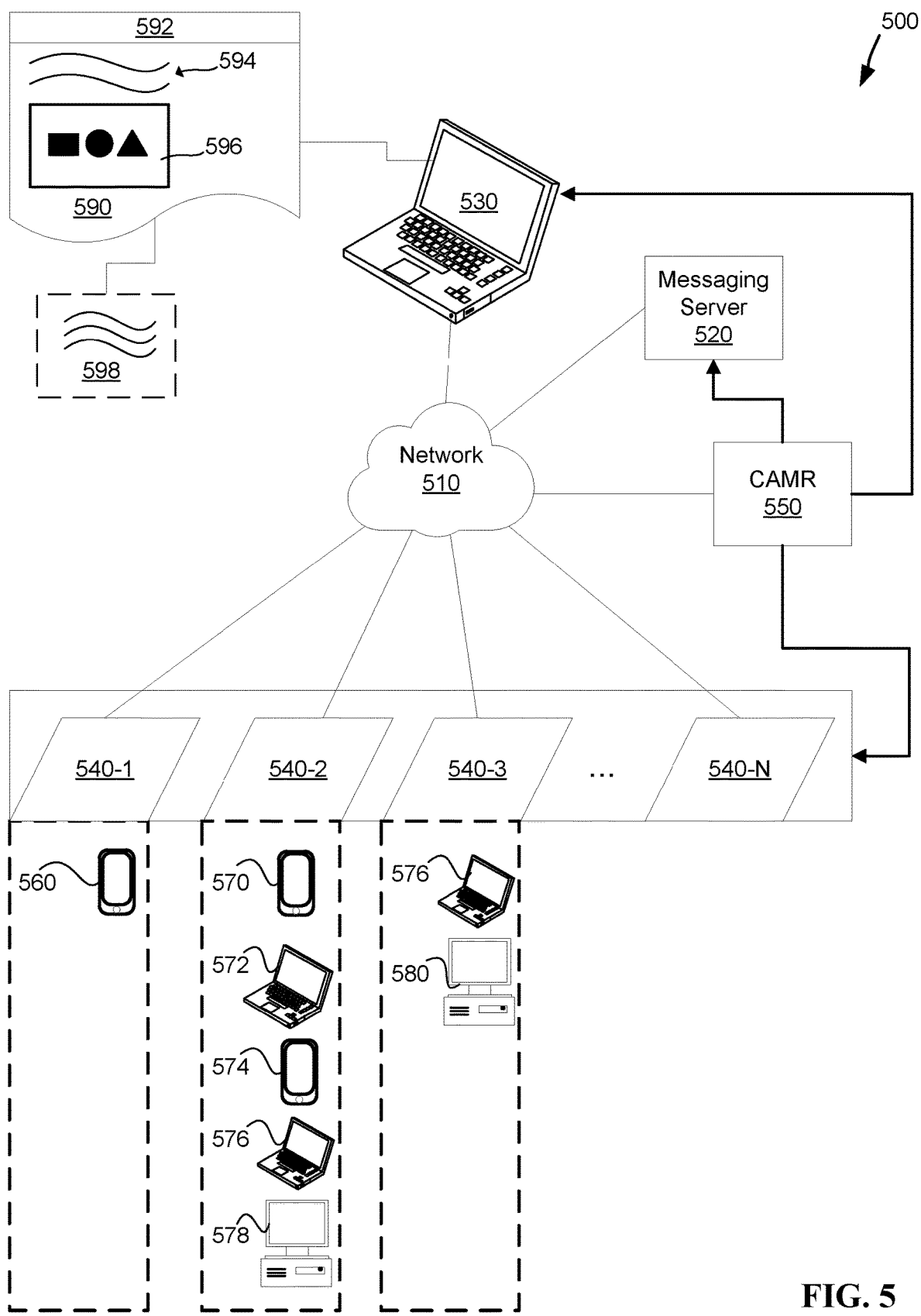
FIG. 5 depicts an example system configured to route messages based on content of the messages, consistent with some embodiments of the disclosure.

FIG. 5 depicts an example system 500 configured to route messages based on content of the messages, consistent with some embodiments of the disclosure. System 500 may include one or more of the following: a network 510; a messaging server 520; at least one message application client 530; a plurality of message application recipients, including message application recipients 540-1, 540-2, 540-3, up to 540-N (collectively, 540); and CAMR 550.

Network 510 may be one or more relevant computer networks, wired networks, wireless networks, local area network, or external networks (e.g., the Internet). Network 510 may be configured to receive and transmit data to the other components of system 500. Network 510 may be utilized by the other components of system 500 to transmit various messages and exchange communications (e.g., text messages, email messages, instant messaging message, chat room messages, chat messages, forum messages).

Messaging server 520 may be a computing device configured to execute or host one or more messaging applications or messaging servers. Messaging server 520 may host or contain one or more messages, and message groups. Message server 520 may be executed by a single computer or computer system (e.g., computer system 100). Message server 520 may be hosted by an abstraction of computing resources (e.g., cloud computing environment 50). Message server 520 may facilitate the operations of a messaging platform, messaging application, or messaging service (e.g., text messages, email messages, instant messaging message, chat room messages, chat messages, forum messages). Message server 520 may directly host one or more messages for facilitating system 500. For example, message server 520 may store copies of messages, chat histories, and the like. Message server 520 may indirectly host the messaging platform of system 500. For example, messaging server 520 may operate by reading only a sender, receiver, or only metadata, but messaging server 520 may not host, store, view or otherwise access any of the content of any of the messages (e.g., not viewing messages, not having access to messages, not having permissions to view messages).

Messaging application client ("client") 530 may represent an instance of a user-interactable interface or portion of a messaging application of system 500. Specifically, client 530 may be a computing device, such as a laptop computer, smartphone, or other client computer (e.g., computer 100). Client 530 may be configured as an interface or portion of the messaging application capable of sending and receiving messages. For example, client 530 may be a web-browser executing on a laptop that provides an interface for a user to draft, compose, send, and receive various messages. In another example, client 530 may be a local application, executed by a smartphone that provides an interface to draft, compose, send, and receive various messages. Client 530 may operate by communicating with recipients 540 directly, without communicating with messaging server 520, and through network 510. Client 530 may operate indirectly, such as by forwarding messages first to messaging server 520 through network 510, and messaging server 510 may forward messages to the recipients 540.

Recipients 540 may be one or more entities that include various users that are capable of sending and receiving various messages. Recipients 540 may be limited or numerous in the number of different individuals. For example, recipients 540 of system 500 may only include recipients 540-1, 540-2, and 540-3. In another example, recipients 540 represented by 540-N may include dozens, hundreds, or even thousands of individuals, and group recipients configured to communicate with messages. Messaging server 520 may store a copy of the various recipients 540 and may reference the stored copy when transmitting and routing the various messages that are sent. Each recipient 540 may include various different individuals or groups that vary in the number. The individuals may be represented by various computing devices depicted in FIG. 4. Specifically, recipient 540-1 may be an individual represented by computing device 560. Further, recipient 540-2 may be a group recipient having many individuals represented by computing device 570, 572, 574, 576, and 578. Further, recipient 540-3 may be a group receiving having individuals represented by computing devices 576 and 580. Some individuals may be a member of multiple recipients 540. For example, computing device 576 may be an individual in both recipient 540-2 and recipient 540-3.

CAMR 550 may be a computer system, configured to perform routing and rerouting of messages to selected candidates, consistent with some embodiments of the disclosure. CAMR 550 may operate as a single computer system, such as computer 100, or may operate as part of a cloud or other service, such as a part of cloud computing environment 50. CAMR 550 may operate as part of a messaging platform at a central location or across a deployed hosting instance. Specifically, CAMR may be a plugin or subroutine that is a part of a messaging service or installed on the application servers that host and route messages for particular organizations and messaging platforms (e.g., such as a part of messaging server 520). CAMR may operate as part of an end-user or user-facing application. Specifically, all members of an organization may have a messaging application in the form of a client program running on an end user device (e.g., CAMR 550 may operate as a part of client 530). CAMR 550 may be an application plug-in or utility that is embedded into the messaging application on each of the end user devices.

CAMR 550 may be configured to route and reroute various messages based on performing content analysis. Specifically, CAMR 550 may intercept messages as they are sent or before they are sent, concurrent with messages being composed. CAMR 550 may then perform one or more content analysis techniques to identify a particular content element (e.g., a textual element, a visual or image element, a metadata element). CAMR 550 may include the performance of one or more artificial intelligence operations (e.g., neural networking by network 400). In some embodiments, CAMR 550 may include performance of one or more artificial intelligence operations on all messages that are routed through system 500 (e.g., performing machine learning or neural networking by training network 400 based on all messages regardless of the particular group or conversation).

CAMR 550 may be configured to perform tagging to select a specific potential messaging recipient 540. CAMR 550 may be configured to tag each content item of a message based on the content analysis. Specifically, using tags that are generated by performing artificial intelligence operations, the CAMR 550 may score each of the particular potential messaging recipients. The CAMR 550 may only send to a particular candidate that is above a predetermined threshold. For example, above a confidence metric of 80% of a match of a tag based on content analysis may be a predetermined threshold. In some embodiments, multiple particular candidates may be above the predetermined threshold. For example, a message may be based on content analysis have a particular confidence metric of 80% to recipients 540-1 and 540-3. If multiple recipients 540 are above a predetermined threshold, CAMR 550 may select one of the recipients 540 to send the message. For example, a message may be sent to only recipient 540-2 even though recipient 540-3 is also above a predetermined threshold. The decision to send to recipient 540-2 may be because the creator of the message has not sent any communications to recipient 540-3 before a predetermined amount of time (e.g., a predetermine amount of time being not sending a message in the last five days, a predetermined amount of time being not sending a message within the last six months, having never sent a message to recipient 540-3 before). In some embodiments, if multiple above potential messaging recipients are above the predetermined threshold, CAMR 550 may send to multiple candidate recipients.

An example message ("message") 590, may be rerouted by CAMR 550 based on content analysis in system 500. Message 590 may include one or more content items that may be used for content analysis by CAMR 550. Message 590 may be composed by a user, such as by client 530, and may be directed to recipient 540-2. Specifically, message 590 may include the following: a title element 592 that includes the text "Missing key found outside building 007"; a text element 594 that includes the text "I found this lost key. I found it this morning just outside in the parking lot by the north sidewalk. Could someone tell me who I should give this to? I'll be at my desk in building 008 every day between 9 am to 5 pm."; a visual element 596 that is a photograph of the key taken by a smartphone (not depicted); and also metadata 598. Metadata 598 may include data regarding the photograph (e.g., geo-location information, timestamps, date taken, shutter speed, camera type, smartphone type, a username of the owner of the smartphone).

The CAMR 550 may process, by the artificial intelligence operations, one or more of the title element 592, the text element 594, the visual element 596, and the metadata 598 to route the message 590. For example, client 530 may transmit, based on direction by a user, the message to a recipient 540-2 a general chat conversation for all employees located at a first location. The CAMR 550 may parse and tag the various parts of message 590, and transmit each of the content elements 592, 594, 596, and 598 along with the tags for processing by content analysis. For example, by performing natural language processing various tags of the message may be "lost items", "found items", missing keys", "building facilities", "security related", and the like. The CAMR 550 may intercept message 590 and may route (based on content analysis) the message to recipient 540-3, a second chat conversation for only security personnel at the first location. The CAMR 550 may reroute the message 590, such as removing the message from an outbound queue for recipient 540-2 before or concurrently with the message being received by messaging server 520). CAMR 550 may remove the message from the outbound queue for recipient 540-2, based on scoring the message 590. For example, CAMR 550 may determine the recipient 540-2 has a score of 67% for receiving message 590, that the predetermined threshold for receiving a message is set at 91% or higher, and that the score of recipient 540-2 is below the predetermined threshold.

CAMR 550 may provide advantages in efficiently selecting a particular message recipient or recipients and avoiding unnecessary messages. For example, message 590 may not have a recipient-field specified. The recipient-field may not be specified because the user forgot to specify a recipient in client 530. The recipient-field may not be specified because the creator of message 590 may not be sure who the recipient 540 is. CAMR 550 may be configured to analyze or train a ML model (e.g., neural network 400) based on each message that is sent throughout system 500. CAMR 550 may be configured to analyze or train ML model by each message that does not have a recipient-field specified. CAMR 550 may also sear CAMR 550 may also be configured to reduce excessive communication within a particular recipient 540. For example, a particular message is sent to recipient 540-2. The particular message is regarding a waste basket that should be emptied in a building of a particular company. Recipient 540-2 is a messaging group that contains hundreds of employees of the particular company. The particular message is the beginning of many additional messages between computing devices 574 and 576, and no other computing devices. Based on a predefined number of additional messages being exceeded, CAMR 550 may create a new recipient 540-X (not depicted). CAMR 550 may move the additional messages from computing devices 574 and 576 to new recipient 540-X such that more additional messages are not created based on the particular message in recipient 540-2.

Figure 6:
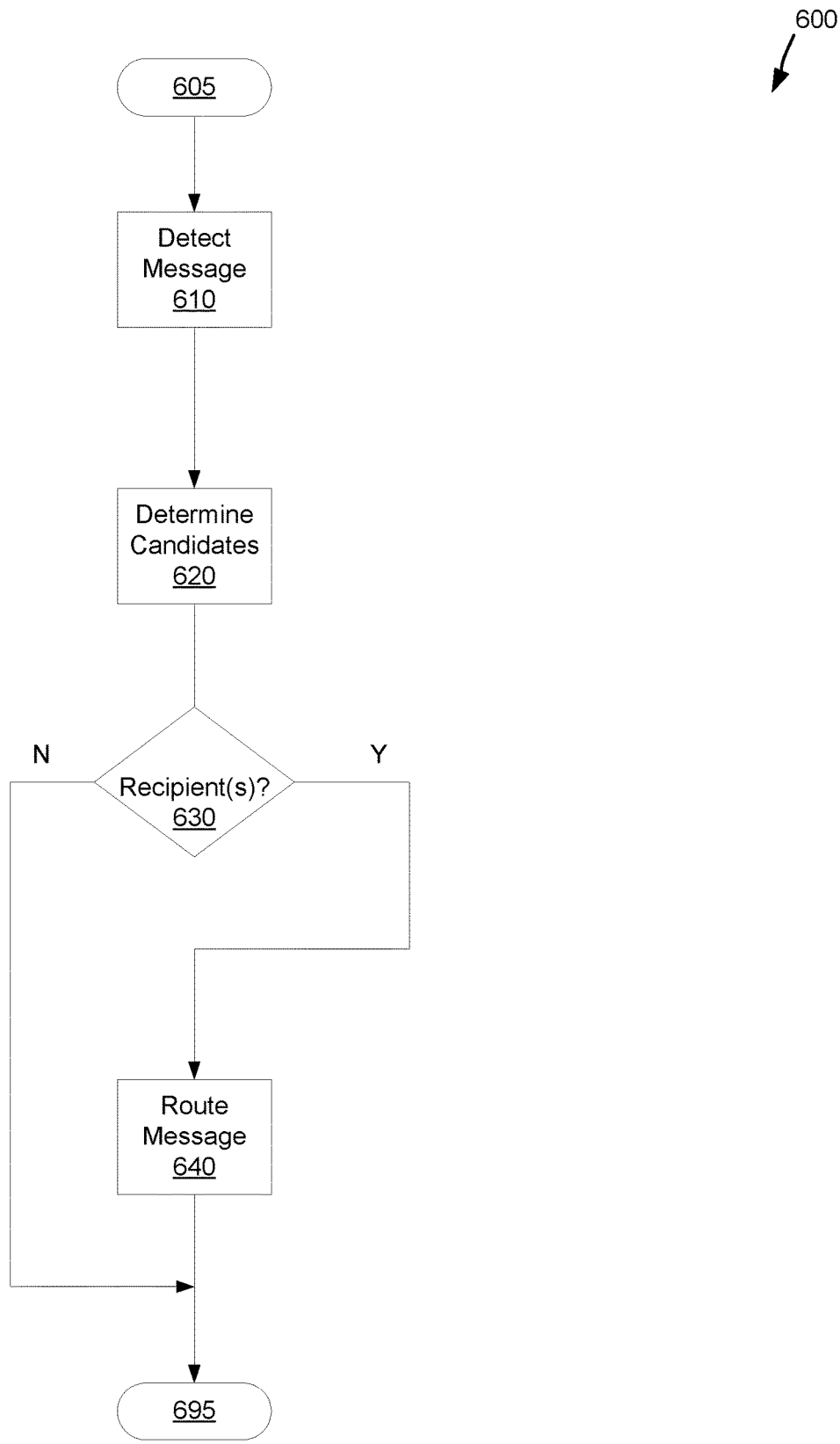
FIG. 6 depicts an example method of performing message routing, consistent with some embodiments of the disclosure.

FIG. 6 depicts an example method 600 of performing message routing, consistent with some embodiments of the disclosure. Method 600 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 600 may be performed by a CAMR executing in software or hardware, such as CAMR 550.

From start 606, method 600 may begin by detecting a message at 610. Detecting the message may include monitoring a client device that is executing an instance of a messaging application. Detecting the message may include monitoring a messaging server of a messaging application for receipt of a message that is to be routed.

At 620 one or more candidate messaging recipients may be determined. The determination may be based on the monitoring for and/or detection of the message (at 610). The determination may include performing a content analysis on one or more content items that are a part of the message (e.g., natural language processing on text in the title or body of the message, natural language processing on a document that is an attachment of the message, image processing on an image in the body or an attachment image, natural language processing on any metadata of the message or attachments of the message). The determination may include tagging or identifying the various content items, such as by generating one or more tags for each on the one or more content items of the message. The determination may include identifying various subjects or objects that are a part of the one or more content items (e.g., natural language processing objects, image processing to generate objects) The determination may include artificial intelligences operations, such as machine learning or other machine-based processing on the content items, the generated tags, and/or the identified subjects or objects. The determination may include determining a set of candidate messaging recipients, such as a single candidate recipient, or multiple potential candidate recipients. A recipient may be identified based on the determination.

If a recipient is identified at 630:Y, then the message may be routed at 640. The message may be routed by rerouting the message. For example, routing the message may include not sending the message to the intended recipient, removing the message from an outbound queue, preventing the message from being delivered, and blocking the recipient from receiving the message. The message may be routed by selecting a particular candidate. For example, if the message does not have an intended recipient, the message may be routed by selecting a candidate as the recipient. The message may be routed by adding additional recipients. For example, a message detected at 610 may have a single recipient, and based on determining of candidates at 620, an additional recipient may be identified. The additional recipient may also receive a copy of the message as a part of the routing at 640. After routing of the message at 640, or if a candidate recipient was not identified at 630:N, method 600 may end at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    detecting a first message that is directed towards a first messaging recipient in a messaging application, wherein the first message contains one or more content items;
    determining, based on the first message and based on a content analysis of the one or more content items and before receiving any user input related to messaging recipients, a set of one or more candidate messaging recipients, wherein the content analysis includes a machine learning model configured to analyze the one or more content items;
    assigning, based on the machine learning model, a tag to a content item of the one or more content items of the first message;
    presenting, in response to the content analysis, the first message and the assigned tag to an administrative user;
    receiving, from the administrative user, a response regarding the assigned tag;
    training, based on the response from the administrative user, the machine learning model;
    identifying, based on the content analysis, a second messaging recipient from the set of one or more candidate messaging recipients; and
    routing, in response to the identifying the second messaging recipient, the first message to the second messaging recipient.

2. The method of claim 1, wherein the method further comprises:
    determining, based on the first message, the first messaging recipient is a group of recipients.

3. The method of claim 1, wherein the method further comprises:
    determining the first messaging recipient is not in the set of candidate messaging recipients; and
    routing, in response to the determining the first messaging recipient is not in the set of candidate messaging recipients, the first message away from the first messaging recipient such that the first message cannot be read by the recipient.

4. The method of claim 1, wherein the one or more content items includes user-visible text elements, and wherein the method further comprises:
    performing natural language processing on the user-visible text elements.

5. The method of claim 1, wherein the one or more content items includes at least one image element, and wherein the method further comprises:
    performing an image analysis on the image element.

6. The method of claim 5, wherein the one or more content items includes metadata elements related to the at least one image, and wherein the method further comprises:
    performing natural language processing on the metadata elements.

7. The method of claim 1, wherein the machine learning model is trained based on all messages in the messaging application.

8. The method of claim 1, wherein the response regarding the assigned tag is the administrative user selecting a different messaging recipient.

9. The method of claim 1, wherein the response regarding the assigned tag is the administrative user removing the tag assigned by the machine learning model.

10. The method of claim 1, wherein the determining the set of candidate messaging recipients further comprises:
    generating a plurality of message recipient confidence scores for each potential messaging recipient of a set of one or more potential messaging recipients;
    comparing the message recipient confidence scores to a predetermined threshold; and
    selecting, in response to a first message recipient confidence score of the plurality exceeding the predetermined threshold and for each of the plurality, a first potential messaging recipient of the set of potential messaging recipients as a first candidate messaging recipient of the set of candidate messaging recipients.

11. The method of claim 1, wherein the method further comprises:
    identifying, based on the content analysis, a third messaging recipient from the set of one or more candidate messaging recipients; and
    routing, in response to the identifying the third messaging recipient, the message to the third messaging recipient.

12. The method of claim 1, wherein the second messaging recipient is a set of three or more users of the messaging app further comprising:
    monitoring a conversation of the second messaging recipient;
    determining a subset of users are participating in the conversation;
    generating, in response to the determining the subset of users, a third messaging recipient; and
    routing the subset of users to the third messaging recipient.

13. A system, the system comprising:
    a memory, the memory containing one or more instructions; and
    a processor, the processor communicatively coupled to the memory, the processor, in response to reading the one or more instructions, configured to:

detect a first message that is directed towards a first messaging recipient in a messaging application, wherein the first message contains one or more content items;

determine, based on the first message and based on a content analysis of the one or more content items, before receiving any user input related to messaging recipients, a set of one or more candidate messaging recipients, wherein the content analysis includes a machine learning model configured to analyze the one or more content items;

assign, based on the machine learning model, a tag to a content item of the one or more content items of the first message;

present, in response to the content analysis, the first message and the assigned tag to an administrative user;

receive, from the administrative user, a response regarding the assigned tag;

train, based on the response from the administrative user, the machine learning model;

identify, based on the content analysis, a second messaging recipient from the set of one or more candidate messaging recipients; and route, in response to the identifying the second messaging recipient, the first message to the second messaging recipient.

14. The system of claim 13, wherein the machine learning model is trained based on all messages in the messaging application.

15. The system of claim 13, wherein the processor is further configured to determine, based on the first message, the first messaging recipient is a group of recipients.

16. The system of claim 13, wherein the processor is further configured to:
determine the first messaging recipient is not in the set of candidate messaging recipients; and
route, in response to the determining the first messaging recipient is not in the set of candidate messaging recipients, the first message away from the first messaging recipient such that the first message cannot be read by the recipient.

17. The system of claim 13, wherein the response regarding the assigned tag is the administrative user reassigning the tag.

18. The system of claim 13, wherein the processor is further configured to:
determine a subset of users are participating in a conversation with the second messaging recipient;
generate, in response to the determining the subset of users, a third messaging recipient; and
routing the subset of users to the third messaging recipient.

19. A computer program product, the computer program product comprising:
one or more computer readable storage media; and
program instructions collectively stored on the one or more computer readable storage media, the program instructions configured to:
detect a first message that is directed towards a first messaging recipient in a messaging application, wherein the first message contains one or more content items;
determine, based on the first message and based on a content analysis of the one or more content items and before receiving any user input related to messaging recipients, a set of one or more candidate messaging recipients, wherein the content analysis includes a machine learning model configured to analyze the one or more content items;
assign, based on the machine learning model, a tag to a content item of the one or more content items of the first message;
present, in response to the content analysis, the first message and the assigned tag to an administrative user;
receive, from the administrative user, a response regarding the assigned tag;
train, based on the response from the administrative user, the machine learning model;
identify, based on the content analysis, a second messaging recipient from the set of one or more candidate messaging recipients; and
route, in response to the identifying the second messaging recipient, the first message to the second messaging recipient.

20. The computer program product of claim 19, wherein the machine learning model is trained based on all messages in the messaging application.

* * * * *